United States Patent
Aprotosoaie

(10) Patent No.: US 9,690,753 B1
(45) Date of Patent: *Jun. 27, 2017

(54) CACHING OF A SITE MODEL IN A HIERARCHICAL MODELING SYSTEM FOR NETWORK SITES

(71) Applicant: Amazon Technologies, Inc., Seattle, WA (US)

(72) Inventor: Gheorghe Aprotosoaie, Chandler, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/643,613

(22) Filed: Mar. 10, 2015

Related U.S. Application Data

(63) Continuation of application No. 12/732,310, filed on Mar. 26, 2010, now Pat. No. 8,990,499.

(51) Int. Cl.
| | | |
|---|---|---|
| *G06F 12/00* | (2006.01) | |
| *G06F 12/08* | (2016.01) | |
| *G06F 13/00* | (2006.01) | |
| *G06F 13/28* | (2006.01) | |
| *G06F 17/00* | (2006.01) | |
| *G06F 17/30* | (2006.01) | |
| *G06F 3/048* | (2013.01) | |
| *G06F 17/21* | (2006.01) | |

(52) U.S. Cl.
CPC ...... *G06F 17/211* (2013.01); *G06F 17/30902* (2013.01)

(58) Field of Classification Search
USPC ........... 711/113, 118–146; 707/802; 715/853
See application file for complete search history.

(56) References Cited

U.S. PATENT DOCUMENTS

| | | | |
|---|---|---|---|
| 6,055,522 A | 4/2000 | Krishna et al. | |
| 6,144,975 A | 11/2000 | Harris, Jr. et al. | |
| 6,578,078 B1 * | 6/2003 | Smith | G06F 17/3089 707/999.01 |
| 6,684,370 B1 | 1/2004 | Sikorsky et al. | |
| 6,961,750 B1 | 11/2005 | Burd et al. | |
| 7,127,681 B1 * | 10/2006 | Jarrad | G06F 17/3089 707/E17.116 |
| 7,139,973 B1 | 11/2006 | Kirkwood et al. | |

(Continued)

OTHER PUBLICATIONS

Arnoldus, Jeroen, Jeanot Bijpost, and Mark van den Brand. "Repleo: a syntax-safe template engine." Proceedings of the 6th international conference on Generative programming and component engineering. ACM, 2007.

(Continued)

*Primary Examiner* — Yaima Rigol
(74) *Attorney, Agent, or Firm* — Thomas | Horstemeyer, LLP

(57) ABSTRACT

Disclosed are various embodiments for caching of a hierarchical model of a network site. Upon receiving a request to resolve a network site, a hierarchical site model associated with a network site is retrieved. A directory model associated with the network site is also retrieved. A caching process is initiated that retrieves at least a subset of page models and loads them into a cache. The caching process is executed in parallel with the processing of the hierarchical site model.

20 Claims, 5 Drawing Sheets

(56) References Cited

U.S. PATENT DOCUMENTS

| | | |
|---|---|---|
| 7,761,497 B1 | 7/2010 | O'Connell, Jr. et al. |
| 7,895,305 B2 | 2/2011 | Beton et al. |
| 8,327,350 B2 | 12/2012 | Chess et al. |
| 2003/0014442 A1 | 1/2003 | Shiigi et al. |
| 2004/0098358 A1 | 5/2004 | Roediger |
| 2005/0177836 A1 | 8/2005 | Lari et al. |
| 2007/0101259 A1 | 5/2007 | Grigoriadis et al. |
| 2008/0115104 A1 | 5/2008 | Quinn |
| 2010/0023691 A1 | 1/2010 | Shin |
| 2010/0094806 A1 | 4/2010 | Apostolides et al. |

OTHER PUBLICATIONS

Parr, Terence John. "Enforcing strict model-view separation in template engines." Proceedings of the 13th international conference on World Wide Web. ACM, 2004.

Liu, Ling, Calton Pu, and Wei Han. "XWRAP: An XML-enabled wrapper construction system for web information sources." Data Engineering, 2000. Proceedings. 16th International Conference on. IEEE, 2000.

\* cited by examiner

```
$currentSite/addressbook.xml
$currentSite/view/addressbook1000.xml
$currentSite/view/addressbook1001.xml
$currentSite/browse.xml
$currentSite/card.xml
$currentSite/cart.xml
$currentSite/cartPreview.xml
$currentSite/checkout.xml
$currentSite/checkoutconfirm.xml
$currentSite/detail.xml
$currentSite/gateway.xml
$currentSite/jump.xml
$currentSite/youraccount.xml
$currentSite/slot/youraccountpage.xml
$currentSite/slot/youraccountpage1000.xml
```

CACHING OF A SITE MODEL IN A HIERARCHICAL MODELING SYSTEM FOR NETWORK SITES

CROSS-REFERENCE TO RELATED APPLICATIONS

This application is a continuation of, and claims priority to, co-pending U.S. Patent Application entitled "CACHING OF A SITE MODEL IN A HIERARCHICAL MODELING SYSTEM FOR NETWORK SITES," filed on Mar. 26, 2010, and assigned application Ser. No. 12/732,310, which is incorporated herein by reference in its entirety.

BACKGROUND

A network site may include any number of network pages, such as web pages. Network sites can be modeled using a hierarchical site model. When the hierarchical site model is employed to administer the network site and/or generate network pages, files from a data store or disk storage system are retrieved and loaded into memory, potentially impairing performance. In addition, data structures and various data formats with which the hierarchical model is expressed must be processed, potentially further impairing performance.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 is a drawing of one example of a directory model associated with a network site employed in the networked environment of FIG. 1 according to various embodiments of the present disclosure.

DETAILED DESCRIPTION

Figure 1:
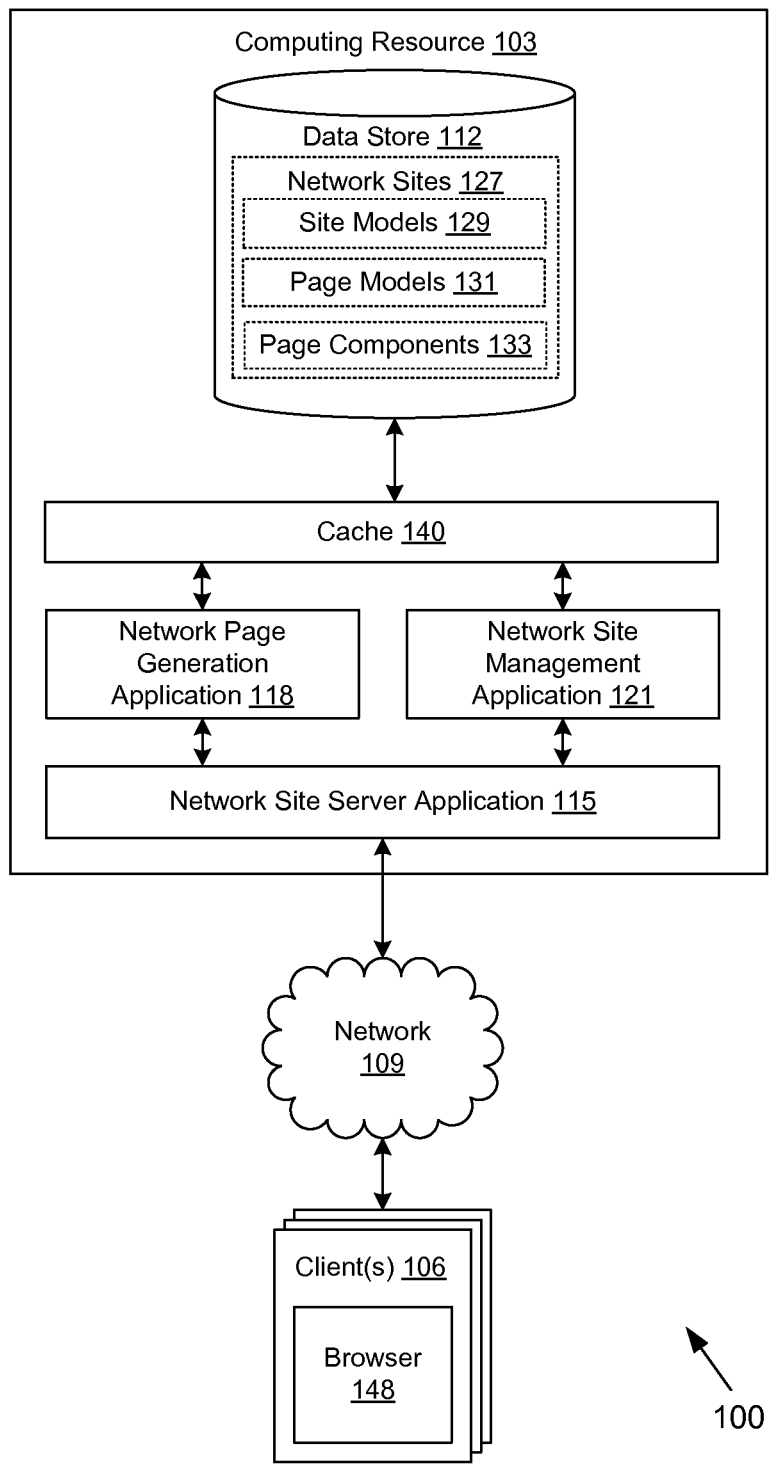
FIG. 1 is a drawing of a networked environment according to various embodiments of the present disclosure.

Network sites may grow to include hundreds of pages, quickly becoming difficult to manage. For example, if each network page of a network site is stored separately as a hypertext markup language (HTML) file, making a change to the copyright notice included at the bottom of each of the network pages may be very time consuming to implement. The site administrator may have to open each file, locate the copyright notice code affected by the change in each file, and manually update the copyright notice code in each file.

The various embodiments disclosed herein relate to a network site employing a hierarchical site model, such as a tree data structure comprising a plurality of nodes. A network page may be logically modeled as a node. In various embodiments, when a change is made to a root node of the tree, the change may propagate to the child nodes of the root node and their descendants, significantly reducing the user interaction necessary to implement the change.

Accordingly, in such hierarchical model, if a site administrator wishes to load the site in a network site management application in order to administer it, the network site management application navigates a hierarchical tree or other hierarchical data structure in order to identify the page models associated with the site in order to present an administrative user interface to the site administrator. If the hierarchical model of the site as well as the page models are expressed in extensible markup language (XML), then an XML file representing the hierarchical site model is processed, which includes entries and/or links describing the various page models comprising the site. Additionally, page models may include references to other XML files or page components that facilitate rendering of a network page for a user of the site. Because of the hierarchical nature of the site model, page models may reference other page models because of the root-parent-child relationship that page models can have with one another in a hierarchical model, and page models may reference various page components that are stored in other XML files, which may in turn reference even further levels of a tree hierarchy. It should be appreciated that the hierarchical site model and page models can be expressed in other formats, including, but not limited to, JavaScript Object Notation (JSON) and other formats in which a hierarchy can be represented.

Therefore, the processing of a hierarchical site model in order to generate an administrative user interface can require the loading of the site model as well as its various page models and page components into memory for presentation to an administrative user. The loading of an entire site into memory for administration by an administrative user when a hierarchical site model is employed can be optimized by embodiments of the disclosure by also employing a directory model of the site. Accordingly, the directory model can be used to cache the various page models and page components so that a network site management application or network page generation application, when navigating a hierarchical site model, does not have to access a data store or disk storage system where the page models are stored. This can be accomplished by caching the page models and/or page components comprising a site in parallel with the processing of a hierarchical site model.

A directory model of the site expresses the page models and page components comprising a site in a format that does not require navigating a hierarchical data structure in order to access the page models and/or page components. In one embodiment, the directory model can be a file system directory structure that describes the location of the page models comprising a hierarchical site model. In other words, the directory model can include a directory in a file system that is associated with the network site, where the directory includes files corresponding to the various page models and page components in a hierarchical site model. The files can be located in various subdirectories beneath the directory, or they may all be stored in a single directory (e.g., a flat directory structure). In another embodiment, the directory model can include a list of links to files representing page models and page components that make these files accessible without navigating a hierarchical tree or other data structure in a hierarchical site model.

Therefore, with reference to FIG. 1, shown is a networked environment 100 according to various embodiments. The networked environment 100 includes a computing device 103 that is in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other computing device or system providing computing capability. The computing device 103 may represent multiple computer systems arranged, for example, in one or more server banks or other arrangements. To this end, the computing device 103 may comprise, for example, a cloud computing device, a grid computing device, and/or any other distributed computing arrangement. Such computer systems may be located in a single installation or may be dispersed among many different geographical locations. In one embodiment, the computing device 103 represents a virtualized computer system executing on one or more physical computing systems. For purposes of convenience, the computing device 103 is referred to herein in the singular. However, in one embodiment, the computing device 103 represents a plurality of computer systems arranged as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include a network site server application 115, a network page generation application 118, a network site management application 121, and other applications, services, processes, systems, engines, or functionality not discussed in detail herein. The network site server application 115 is executed to receive network page requests from the client 106 over the network 109, and to serve up network pages in response to the network page requests. The network site server application 115 may comprise a web server application such as Apache HTTP Server, Microsoft® Internet Information Services (IIS), and/or any other type of network page server application.

The network page generation application 118 is executed in response to a network page request received by the network site server application 115 in order to generate a network page corresponding to the network page request. In one embodiment, the network page generation application 118 includes an interpreter for JavaServer Pages (JSP). The network site management application 121 is executed to receive network page requests from administrative users of the network site 127 through the network site server application 115. The network site management application 121 may allow network site administrators to define new network pages and logical models of network pages, redefine existing network site characteristics, and/or control other aspects relating to a network site 127.

The data stored in the data store 112 includes, for example, data corresponding to one or more network sites 127. The data can include site model 129 data, page model 131 data, page component 133 data, and potentially other data. A hierarchical site model 129 can be associated with a network site 127. The hierarchical site models 129 can define various top level page models 131 that comprise a network site 127. As a non-limiting example, an electronic commerce related site can define top level page models that correspond to the various functions that are available to a user of the site. In one example, a corresponding hierarchical site model can reference a shopping cart page model, a product search page model, a product detail page model, a product browse page model, and potentially other page models. These top level page models 131 can also be thought of as the basic applications implemented by the site to which the hierarchical site model corresponds.

The page models 131 themselves can then describe the content of a network page to which they correspond by referencing page components 133. Page models 131 define a plurality of logical page models that may be translated into network pages by the network page generation application 118. A page model 131 comprises the base unit, or node, of the hierarchical network site model. In one embodiment, the page model 131 is an extensible markup language (XML) document. In another embodiment, the page model 131 is a JavaScript Object Notation (JSON) document or other type of document.

Each page model 131 may include, for example, page components 133, a link to a parent page model, and/or other elements. A page component 133 can include a code fragment or page that can describe how a particular portion of a page should be rendered. In one embodiment, a page model 131 can assign a portion of a display region of network page to a particular page component 133. In addition, another page model 131 can reference the same page component 133, as a page component 133 can represent a code fragment that is reusable in any page model 131. As one non-limiting example, multiple page models can reference a copyright notice page component 133. Accordingly, if a site administrator wishes to edit the text of a copyright notice page component 133, the administrator need only edit the text once, and the modified text will be reflected in the various page models 131 that employ the copyright notice page component 133.

As noted above, page models 131 can be associated with a parent page model and/or one or more child page models. A parent page model can impose restrictions on a child page model, and a child page model can inherit page components associated with a parent page model. As one non-limiting example, a parent page model can designate that a copyright notice is to be placed in a footer region of a network page. Accordingly, child page models can inherit this feature from the parent page model. The parent page model defines a link to another page model 131 that is a parent for a particular page model 131. When a page model 131 is a root page model, as a non-limiting example, the parent page model may comprise a null value or may be empty. In various embodiments, page models 131 may also include links to child page models 131 and other page models 131 as desired.

The computing device 103 also includes a cache 140 that can cache the hierarchical site model, page models 131, page components 133 and/or other data associated with a hierarchical site model. If an administrative user wishes to administer a particular network site 127 served up by the computing device 103 it may be desirable, for performance reasons, to load the various page models 131 and page components 133 into memory to improve performance of a user interface generated by the network site management application 121 created for that purpose. Accordingly, the network site management application 121 can employ a directory model of a network site 127 for this purpose, rather than relying on a hierarchical site model of the network site 127. As noted above, traversing all of the nodes of a hierarchical site model may require navigating a large tree structure and/or processing many XML files. Accordingly, using a directory model of the network site 127 that provides quicker access to the site's page models 131 and/or page components 133, and caching these files, can improve performance by eliminating and/or reducing the need of the network site management application 121 to make disk accesses or data store 112 requests when manipulating the hierarchical site model associated with a network site 127. Other aspects of this functionality are discussed in more detail herein.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 148 and/or other applications. The browser 148 may be executed in a client 106, for example, to access and render network pages, such as web pages, or other network content served up by the computing device 103 and/or other servers. The client 106 may be configured to execute applications beyond browser 148 such as, for example, email applications, instant message applications, and/or other applications.

Figure 2:
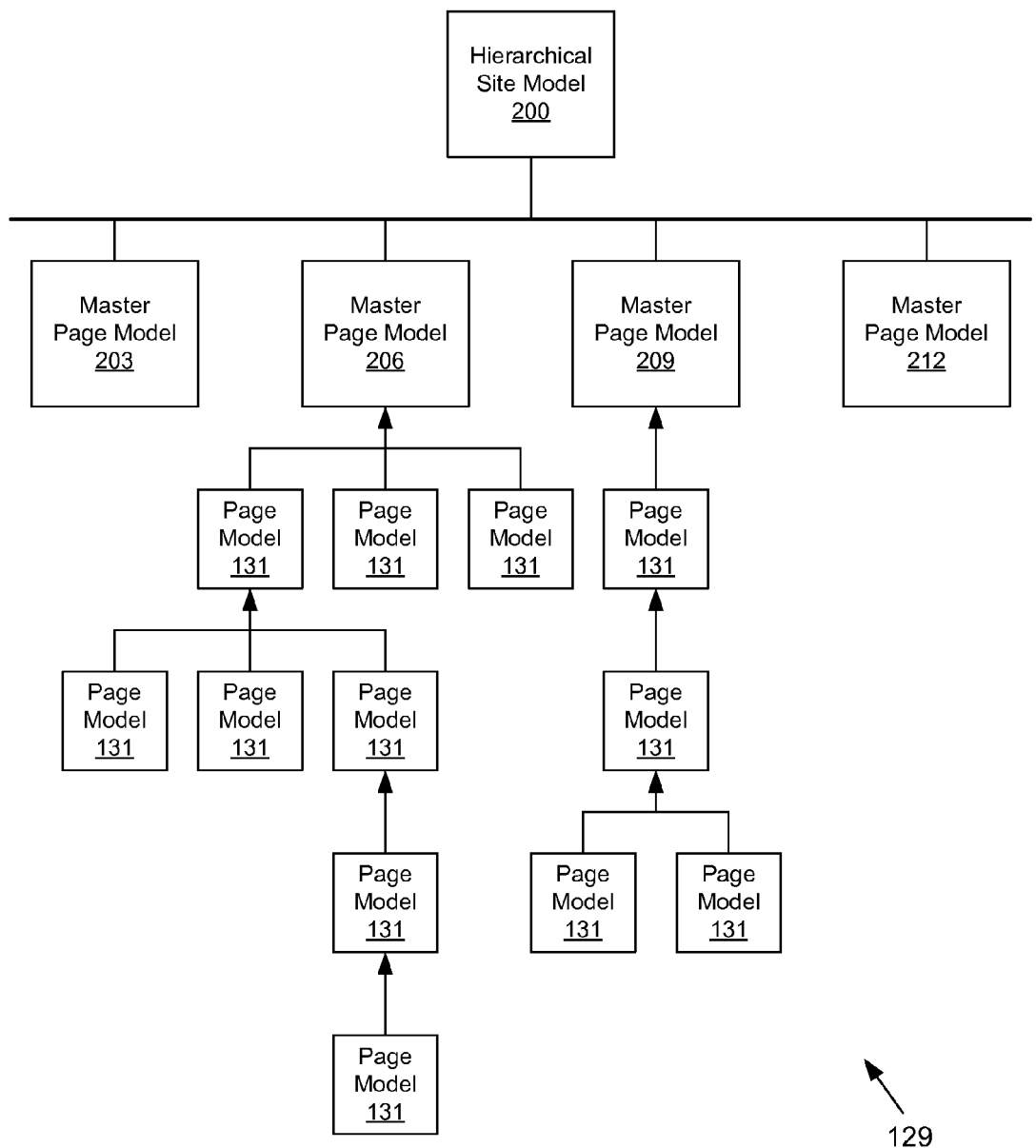
FIG. 2 is a drawing of one example of a hierarchical network page model employed in the networked environment of FIG. 1 according to various embodiments of the present disclosure.

Referring next to FIG. 2, a hierarchical network site model 200 is shown. The hierarchical network site model 200 includes a plurality of master page models 203, 206, 209, 212 and a plurality of page models 131. Each of the master page models 203, 206, 209, 212 represents page models 131 that have no parent page model. In one embodiment, as a non-limiting example, the master page models 203, 206, 209, 212 can represent applications implemented by a network site, or sections of a network site. In the non-limiting example of an electronic commerce related site, the master page models 203, 206, 209, 212 can be designated as a home page model, a catalog browse page model, a product detail page model, and a shopping cart page model. The master page models 203, 206, 209, 212 can then reference various page components 133 and/or child page models with which they are associated As depicted in FIG. 2, the master page models 203, 212 have no children, while the master page models 206, 209 do have children. The page models 131 shown in FIG. 2 each have a parent page model corresponding to the respective master page model 206, 209 or another page model 131. The page models 131 can also reference page components 133, which can, in turn, reference still other page components 133. Accordingly, in order to render a network page or load the network site represented by the hierarchical network site 200 into memory without a directory model, traversal of the depicted hierarchical data structure, or XML files that represent the hierarchical network site model 200, may be required.

Although not depicted in FIG. 2, any of the page models 131 or master page models 203, 206, 209, 212 may include hyperlinks to one or more network pages of the network site that are not included within the model. Such network pages may comprise, for example, network pages for individual items or products offered for order. In addition, multiple page models 131 or master page models 203, 206, 209, 212 may link to a single network page.

Referring back to FIG. 1, a general description of the operation of the various components of the networked environment 100 is provided. In one embodiment, a user (e.g., a site administrator) at a client 106 requests an administration tool user interface over the network 109 from the network site server application 115. This request is then passed to the network site management application 121. Authentication of the administrative user may be performed by either the network site server application 115 or the network site management application 121. Accordingly, the network site management application 121 loads the site into memory so that the various page models 131 can be manipulated or page models 131 can be added, removed, etc., from a hierarchical site model associated with a particular site.

As a non-limiting example, the administrative user may desire to add a new page model 131 as a child page model 131 of some other existing page model 131. A user interface may be provided to the administrative user within a network page that graphically resembles the parent page model 131. The user interface may provide a means for selecting one or more slots or page components of the page model 131 for modification. For example, a region boundary may be traced out with a border, making a slot user selectable with a single click, double click, right click, etc. within the browser 148.

Accordingly, in addition to the computing resources needed in order to traverse and/or process such a hierarchical site model 200, when loading the page models 131, master page models 203, 206, 209, 212, and page components 133 comprising the network site, if the above are represented by XML files in a data store 112 (FIG. 1) or on a disk, there will also exist a certain delay in order to retrieve the XML files from the data store 112 and/or disk. Therefore, upon receiving a request to resolve a particular network site 127 (FIG. 1), the network site management application 121 can, in parallel with the processing of a hierarchical site model, initiate caching of the page models 131 and/or page components 133 associated with a particular network site from a directory model of the site.

Accordingly, as the network site management application 121 traverses a hierarchical site model associated with a particular site, the various page models 131 and/or page components 133 have begun the process of being placed in a cache 140, thereby reducing any latency associated with disk accesses and/or requests made to the data store 112. Because caching page models 131 and page components 133 using the directory model does not require traversing a hierarchical site model, traversing hierarchical tree data structure or processing of a large number of XML files that may reference other XML files, many of the resources needed by the network site management application 121 as it processes the hierarchical site model will have been cached by this parallel process initiated by the network site management application 121. In one embodiment, the network site management application 121 can initiate a thread that performs caching of page models 131 and/or page components 133 in the cache 140.

Additionally, as a site administrator manipulates the various page models 131 and page components 133 associated with a site (as well as the hierarchical site model itself), these changes can be written to the cache 140 and committed to the data store 112 or other disk resource at a later point in time, or in parallel to other operations performed by the network site management application 121, thereby further reducing costly data store 112 requests or disk accesses during administration of a network site by an administrator.

In other embodiments, the network site management application 121 can cache a subset of page models 131 and page components 133 associated with a network site 127. As a non-limiting example, a directory model can specify certain page models 131 and/or page components 133 that should be cached in the cache 140, and specify certain page models 131 and/or page components 133 that should not be cached. As one example, the network site management application 121 can designate certain page models 131 as user modifiable page models and others as static page models 131 that cannot be modified. Accordingly, the network site management application 121 can cache the user modifiable page models in the cache 140. Segregating page models 131 and/or page components 133 into those that should be cached and those that should not be cached can facilitate manipulation of network sites 127 that include a very large number of page models 131 and/or page components 133.

In another embodiment, a user at a client 106 initiates a request to resolve a particular network site 127 or requests a particular page associated with the site over the network 109 from the network site server application 115. This request is then passed to the network page generation application 118. The network page generation application 118 then generates a network page from a page model 131 by translating the page model 131 for example, into HTML code and/or other types of network page code that may be rendered by a browser 148.

Accordingly, upon receiving the request to resolve a network site 127 or a page associated with the network site 127, the network page generation application 118 can initiate a parallel process to cache page models 131 and page components 133 in a cache 140 as noted above. Accordingly, performance of serving requests from a user for content associated with a network site employing a hierarchical site model can be improved due to the caching process, as disk accesses and/or potentially costly data store 112 requests for page models 131 and/or page components 133 can be reduced, and the content retrieved from a cache 140 instead. It should be appreciated that the network page generation application 118 and/or network site management application 121 can also request a page model 131, site model 129, etc., directly from the data store 112 instead of requesting an item from the cache 140.

Referring next to FIG. 3, shown is a non-limiting example of a directory model 300 of a network site 127 (FIG. 1) according to various embodiments of the disclosure. The directory model 300 corresponds to a hierarchical site model of a network site 127 as described above. As noted above, the directory model 300 facilitates caching of page models 131 (FIG. 1) and/or page components 133 (FIG. 1) in a cache 140 (FIG. 1) to improve performance of a network page generation application 118 and/or network site management application 121 by reducing and/or eliminating potentially costly data store 112 (FIG. 1) requests or disk accesses when processing a hierarchical site model (FIG. 1) associated with a network site 127.

In the depicted directory model 300, a list of a plurality of page models 131 and/or page components 133 associated with a network site 127 are depicted. Accordingly, the network page generation application 118 or network site management application 121 can load the depicted page models 131 and/or page components 133 into a cache 140 without having to traverse a hierarchical site model. Accordingly, when the hierarchical site model is processed by the network page generation application 118 and/or network site management application 121, the caching process of the needed page models 131 and/or page components 133 is initiated in parallel. In this way, potentially costly (from a performance point of view) disk accesses and/or data store 112 requests can be conducted in parallel with the processing of a hierarchical site model, which can consume significant computing resources.

Figure 4:
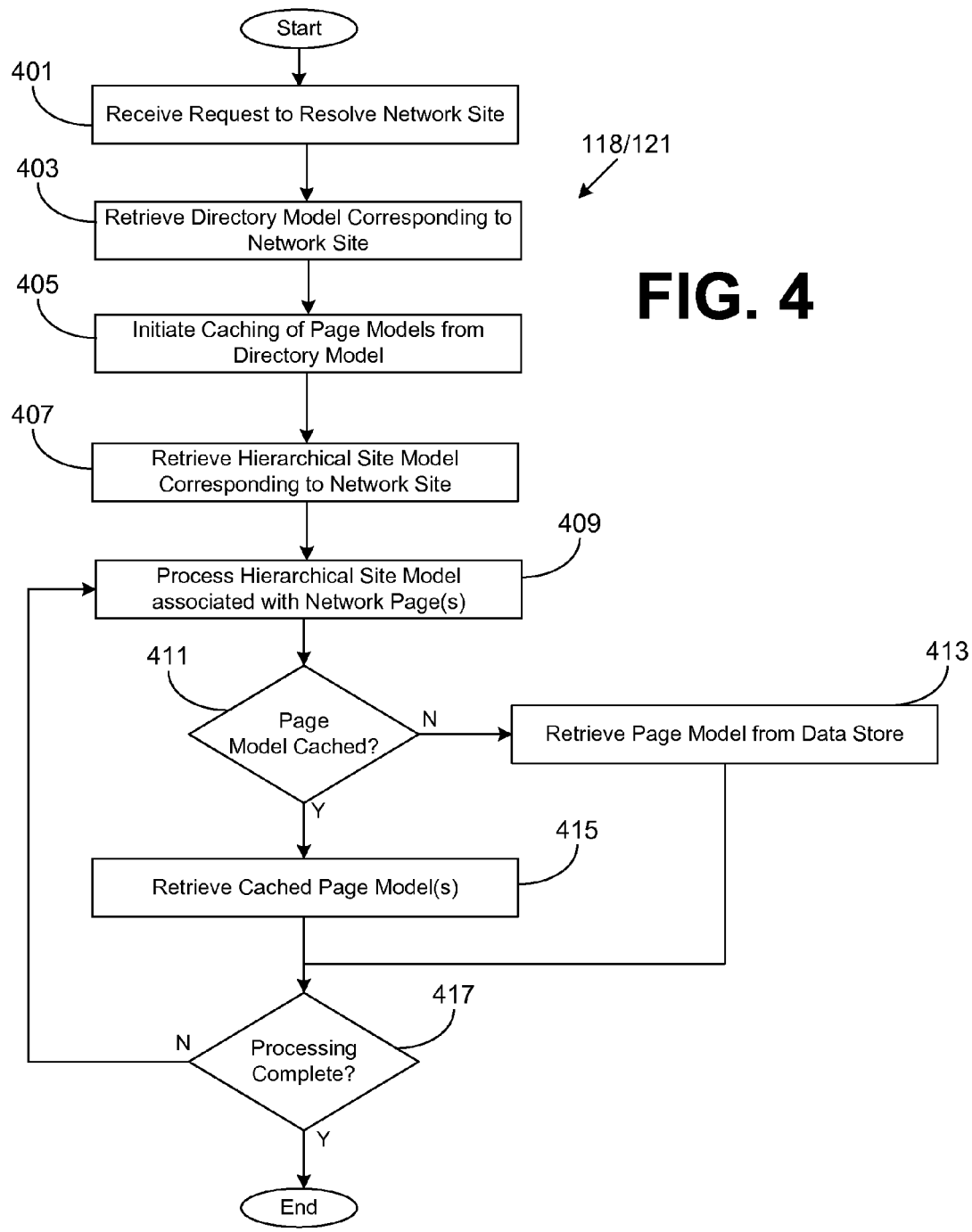
FIG. 4 is a drawing of one example of execution of a network site management application of FIG. 1 according to various embodiments of the present disclosure.

Referring next to FIG. 4, shown is a flowchart that provides one example of the operation of a portion of the network page generation application 118 and/or network site management application 121 according to various embodiments. It is understood that the flowchart of FIG. 4 provides merely an example of the many different types of functional arrangements that may be employed to implement the operation of the portion of the network page generation application 118 and/or network site management application 121 as described herein. As an alternative, the flowchart of FIG. 4 may be viewed as depicting an example of steps of a method implemented in the computing device 103 (FIG. 1) according to one or more embodiments.

Beginning with box 401, the network page generation application 118 and/or network site management application 121 obtains a request to resolve a network site 127 (FIG. 1) from a client 106 (FIG. 1) over the network 109 (FIG. 1). Next, in box 403, the network page generation application 118 and/or network site management application 121 retrieves a directory model 300 (FIG. 3) associated with a network site 127. Then, in box 405, the network page generation application 118 and/or network site management application 121 initiates caching of page models 131 (FIG. 1) and/or page components 133 (FIG. 1) in a cache 140 (FIG. 1) by utilizing the directory model to locate the storage location of page models 131 and page components 133.

Then, in box 407, the network page generation application 118 and/or network site management application 121 retrieves a hierarchical site model associated with a network site 127. In box 409, the network page generation application 118 and/or network site management application 121 processes the hierarchical site model. In box 411, when processing the hierarchical site model, the network page generation application 118 and/or network site management application 121 determines whether a needed page model 131 and/or page component 133 is located within the cache 140. If the page model 131 and/or page component 133 is not cached, then the network page generation application 118 and/or network site management application 121 requests the needed page model 131 and/or page component 133 from a data store 112 or disk storage system. If the page model 131 and/or page component 133 is cached in the cache 140, then the network page generation application 118 and/or network site management application 121 retrieves the needed data from the cache 140 and proceeds to determine whether processing of the hierarchical site model is complete.

Figure 5:
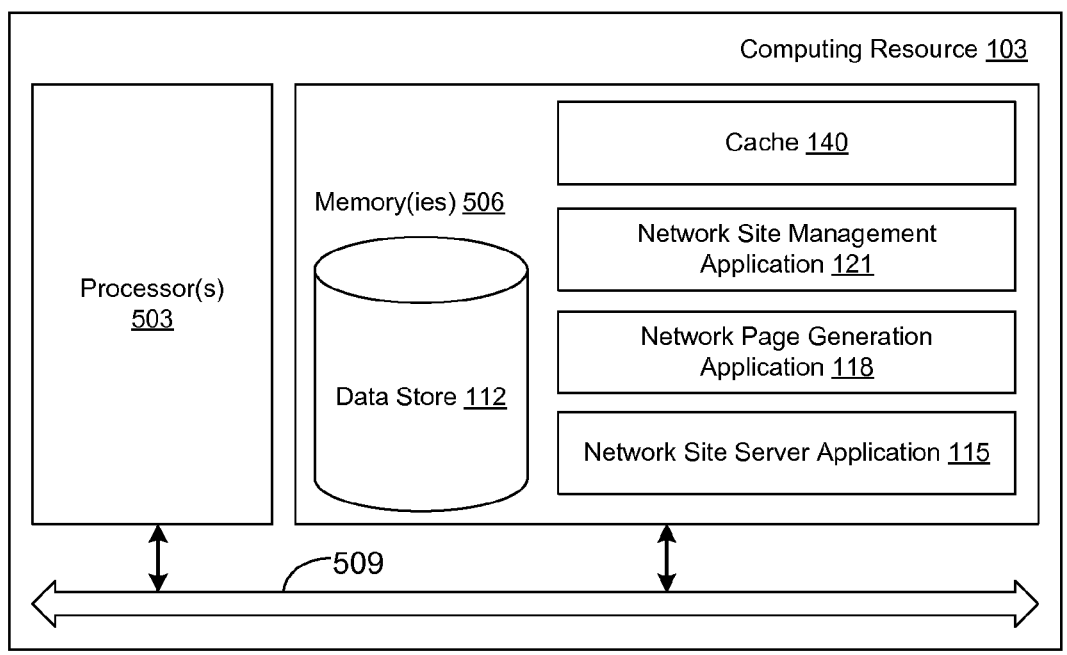
FIG. 5 is a drawing of one example of the computing device of FIG. 1 according to an embodiment of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the network site management application 121, the network page generation application 118, the network site server application 115, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the network site management application 121, the network page generation application 118, the network site server application 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the network page generation application 118 and the network site management application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including network site management application 121, the network page generation application 118, and the network site server application 115, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer readable medium embodying a program executable on at least one computing device, the program having instructions that when executed cause the at least one computing device to perform a method comprising:
   receiving, by the at least one computing device, a request to generate a user interface of a network site; and
   executing, by the at least one computing device, a hierarchical loading process and a directory model caching process sharing access to a cache, where the hierarchical loading process utilizes more computing resources and less storage resources relative to the directory model caching process, wherein:
   the directory model caching process comprises:
      initiating, by the at least one computing device, caching of a plurality of page models associated with the network site from a directory model, wherein the directory model identifies a respective storage location of individual ones of the plurality of page models in a data store; and
      loading, by the at least one computing device, at least a subset of the plurality of page models in the cache; and
   the hierarchical loading process comprises:
      retrieving, by the at least one computing device, a hierarchical site model associated with the network site, the hierarchical site model identifying the plurality of page models associated with the network site and a hierarchical relationship of the plurality of page models comprising the network site;
      processing, by the at least one computing device, the hierarchical site model to identify at least a subset of the plurality of page models; and
      retrieving, by the at least one computing device, ones of the at least a subset of the plurality of page models from the cache in response to determining that the at least one page model is stored in the cache.

2. The non-transitory computer readable medium of claim 1, wherein the plurality of page models comprises a first page model inheriting from a second page model and the second page model inheriting from a root page model.

3. The non-transitory computer readable medium of claim 1, wherein the hierarchical loading process and the directory model caching process are initiated substantially in parallel.

4. The non-transitory computer readable medium of claim 1, wherein the hierarchical site model comprises at least one of a home page model, a shopping cart page model, a product search page model, a product detail page model, or a product browse page model.

5. The non-transitory computer readable medium of claim 1, wherein
   the directory model caching process further comprises:
      retrieving, by the at least one computing device, at least one of a plurality of components individually referenced by the ones of the plurality of page models; and
      storing, by the at least one computing device, the at least one of the plurality of components in the cache; and
   the hierarchical loading process further comprises:
      retrieving, by the at least one computing device, one of the plurality of components from the cache in response to determining that the one of the plurality of components is stored in the cache.

6. The non-transitory computer readable medium of claim 1, wherein executing the hierarchical loading process and the directory model caching process comprises initiating, by the at least one computing device, a plurality of threads.

7. The non-transitory computer readable medium of claim 1, wherein the method further comprises:
   modifying, by the at least one computing device, the at least one page model in the cache; and
   committing, by the at least one computing device, the at least one page model to the data store in response to the modifying.

8. A system, comprising:
   at least one computing device configured to perform a method comprising:
      receiving, by the at least one computing device, a request to resolve a network site; and
      in response to receiving the request to resolve the network site, executing, by the at least one computing device, a hierarchical loading process and a directory model caching process sharing access to a cache, wherein the hierarchical loading process utilizes more computing resources and less storage resources relative to the directory model caching process;
   wherein the directory model caching process comprises:
      retrieving, by the at least one computing device, a directory model of the network site, wherein the directory model identifies a respective storage location of individual ones of a plurality of page models from a hierarchical site model;
      retrieving, by the at least one computing device, at least a subset of the plurality of page models from the respective storage location of the individual ones of the plurality of page models identified by the directory model; and
      loading, by the at least one computing device, the at least a subset of the plurality of page models in the cache; and
   the hierarchical loading process comprises:
      loading, by the at least one computing device, a representation of the hierarchical site model of the network site into the cache from a data store;
      determining, by the at least one computing device, that one of the plurality of page models corresponding to a page associated with the request to resolve the network site is stored in the cache; and generating, by the at least one computing device, the page based at least in part upon at least the one of the plurality of page models and the hierarchical site model.

9. The system of claim 8, wherein:

the plurality of page models comprises a first page model inheriting from a second page model and the second page model inheriting from a root page model;

the first page model corresponds to the page associated with the request to resolve the network site;

generating the page further comprises loading the first page model; and loading the first page model comprises loading the second page model and loading the root page model.

10. The system of claim 8, wherein the directory model caching process further comprises retrieving, by the at least one computing device, at least one of a plurality of components individually referenced by the ones of the plurality of page models and caching the plurality of components in the cache; and the hierarchical loading process further comprises retrieving, by the at least one computing device, one of the plurality of components from the cache in response to determining that the one of the plurality of components is stored in the cache.

11. The system of claim 8, wherein the hierarchical loading process and the directory model caching process are initiated substantially in parallel.

12. The system of claim 8, wherein the directory model comprises a list of files representing the plurality of page models from the hierarchical site model, the list of files further including the respective storage location of files in the data store.

13. The system of claim 8, wherein the directory model is a directory structure in which a plurality of files representing the plurality of page models from the hierarchical site model is stored.

14. The system of claim 8, wherein the directory model caching process further comprises designating, by the at least one computing device, a first subset of the page models as a user modifiable subset and a second subset as a static subset, wherein the user modifiable subset is stored in the cache.

15. A method, comprising:

receiving, in a data store in communication with at least one computing device, a request to resolve at least one network page associated with a network site; and initiating, by the at least one computing device, a hierarchical loading process and a directory model caching process sharing access to a cache, the hierarchical loading process utilizing more computing resources and less storage resources relative to the directory model caching process; wherein the directory model caching process comprises:

initiating, by the at least one computing device, a caching process of a directory model identifying a respective storage location associated with individual ones of a plurality of page models from a hierarchy of page models, the caching process retrieving at least a subset of the plurality of page models from the respective storage location and caching the at least a subset of the plurality of page models in the cache; and the hierarchical loading process comprises:

processing, by the at least one computing device, a hierarchical site model by traversing a hierarchical tree data structure and processing a plurality of metadata files associated with the hierarchical site model, the plurality of metadata files identifying a plurality of page model dependencies; and retrieving, by the at least one computing device, one of the plurality of page models from the cache in response to determining that the one of the plurality of page models is stored in the cache.

16. The method of claim 15, wherein the hierarchical site model comprises at least one of a home page model, a shopping cart page model, a product search page model, a product detail page model, or a product browse page model.

17. The method of claim 15, wherein the directory model caching process further comprises retrieving, by the at least one computing device, at least one of a plurality of components individually referenced by the ones of the plurality of page models and caching the plurality of components in the cache; and the hierarchical loading process further comprises retrieving, by the at least one computing device, one of the plurality of components from the cache in response to determining that the one of the plurality of components is stored in the cache.

18. The method of claim 15, wherein the directory model is a list of files representing the plurality of page models from the hierarchy of page models, the list of files further including the respective storage location of files in the data store.

19. The method of claim 15, wherein the plurality of page models are configurable as at least one of: a root page model, a child page model, or a parent page model.

20. The method of claim 15, wherein:

retrieving the at least a subset of the plurality of page models further comprises designating a first subset of the page models as a user modifiable subset and a second subset as a static subset and retrieving the user modifiable subset; and loading the at least a subset of the plurality of page models in the cache further comprises loading the user modifiable subset in the cache.

* * * * *